United States Patent
Davis, Jr.

(10) Patent No.: US 9,072,279 B2
(45) Date of Patent: Jul. 7, 2015

(54) SAFETY COLLAR WITH CLAMPING CLOSURE MECHANISM

(71) Applicant: Albert H. Davis, Jr., Decatur, GA (US)

(72) Inventor: Albert H. Davis, Jr., Decatur, GA (US)

( * ) Notice: Subject to any disclaimer, the term of this patent is extended or adjusted under 35 U.S.C. 154(b) by 93 days.

(21) Appl. No.: 13/987,507

(22) Filed: Aug. 1, 2013

(65) Prior Publication Data

US 2015/0034022 A1    Feb. 5, 2015

(51) Int. Cl.
   *A01K 27/00*    (2006.01)
   *A44B 11/12*    (2006.01)
   *A44B 11/06*    (2006.01)

(52) U.S. Cl.
   CPC .......... *A01K 27/001* (2013.01); *Y10T 24/4016* (2015.01); *A01K 27/005* (2013.01); *A44B 11/12* (2013.01); *A44B 11/065* (2013.01)

(58) Field of Classification Search
   CPC ...... A44B 11/12; A44B 11/065; A44B 11/14; A01K 27/001; A01K 27/005; A01K 27/00
   USPC .......... 119/863, 856; 24/170, 31 R, 32, 33 R, 24/163 R, 168; 2/311–322
   See application file for complete search history.

(56) References Cited

U.S. PATENT DOCUMENTS

| | | | | |
|---|---|---|---|---|
| 3,344,486 | A * | 10/1967 | Eveland ........................... | 24/194 |
| 3,402,439 | A * | 9/1968 | Currat .............................. | 24/194 |
| 3,425,104 | A * | 2/1969 | Mochizuki ............... | 24/265 WS |
| 4,321,891 | A * | 3/1982 | Moeller ........................ | 119/863 |
| D302,140 | S * | 7/1989 | Johnston ..................... | D11/216 |
| 5,036,864 | A * | 8/1991 | Yewer, Jr. ..................... | 128/876 |
| 5,161,351 | A * | 11/1992 | Woodruff ......................... | 54/6.1 |
| 5,432,951 | A * | 7/1995 | Yewer, Jr. ........................... | 2/44 |
| 5,500,959 | A * | 3/1996 | Yewer, Jr. ....................... | 602/19 |
| 5,647,824 | A * | 7/1997 | Levenson ........................ | 482/92 |
| 5,787,500 | A * | 8/1998 | Lobello ............................... | 2/1 |
| 6,715,449 | B1 * | 4/2004 | Jordan ......................... | 119/863 |
| 7,712,191 | B2 * | 5/2010 | Huang ....................... | 24/68 CD |
| 8,522,728 | B2 * | 9/2013 | Davis, Jr. ..................... | 119/863 |
| D698,503 | S * | 1/2014 | Fidrych et al. ............... | D30/152 |
| 8,739,742 | B2 * | 6/2014 | Waters .......................... | 119/863 |

* cited by examiner

Primary Examiner — Yvonne Abbott-Lewis
(74) Attorney, Agent, or Firm — Harry I Leon; Vivian L. Steadman

(57) ABSTRACT

A collar useful in animal care, which includes a closure connector and a flexible belt having a free end and distal therefrom a thickened knob. Anchored within the connector's frame, the knob is disposed contiguous with a narrow slot formed therein through which all of the belt, except the knob, is initially threaded. Once looped back around the connector's frame, the free end is pushed through the frame until it re-emerges therefrom. With the collar adjusted to provide a snug fit, one can then activate a closure mechanism, in which the foot of an arm pivotally connected to the frame clamps a short portion of the belt, across its entire transverse width, against the frame. When the belt is so clamped, pulling on it increases forces pressing the foot against the belt. Cast from a silicon rubber/phosphorescent additive mixture, the belt exhibits luminescent properties, making it visible in the dark.

5 Claims, 4 Drawing Sheets

SAFETY COLLAR WITH CLAMPING CLOSURE MECHANISM

CROSS-REFERENCE TO RELATED APPLICATION

This application is a divisional application of copending application Ser. No. 12/932,416, filed Feb. 24, 2011.

FIELD OF THE INVENTION

The invention relates generally to safety collars fittable to the necks of dogs as well as to a wide variety of inanimate, cylindrically-shaped objects.

BACKGROUND OF THE INVENTION

Snug-fitting collars which dogs can wear day and night in all weather conditions without the collar causing abrasion to the animal's skin are unknown in the prior art. Even leather collars—the belts of which have about the same surface characteristics as does a dog's skin—can cause abrasion, especially when the collar is wet or cold.

Moreover, because the fasteners used to secure these prior art collars feature a locking mechanism in which a single pin engages one of a series of spaced apart holes formed in the collar's belt, the fasteners limit the degree to which the collars can be adjustably fitted to individual dogs. Not only is the degree of adjustability of such a collar limited by its fastener, but also the latter's strength is at best marginal, depending as it does upon a structure in which a single pin engages a stretchable hole. Compounding these problems is the tendency, as the collar ages, for the belt to become brittle and the holes to enlarge, potentially allowing the animal to slip out of its collar and escape.

A need also exists for a safety collar which can be seen in the dark. Such a collar could be used in a wide variety of applications, including helping a pet owner to avoid accidentally stepping on his animal in a darkened hallway or room, as well as to facilitate a person's locating collar-bandable objects, such as scuba diving tanks, when they are obscured from view because of poor lighting conditions.

SUMMARY OF THE INVENTION

The primary object of the present invention is to provide an improved collar for animals, as well as for inanimate, cylindrically-shaped objects, the collar being readily fittable thereon with a high degree of adjustability and having a closure mechanism which, when it is activated, holds the collar's belt in such a way that pulling on the belt increases the forces locking it in place.

A further object of this invention is to provide such a collar with a belt which is stable in both wet and cold environments and which has a finished surface which is a non-irritant to the hair and skin of animals.

A still further object of this invention is to provide an improved collar which exhibits luminescent properties, allowing the animal wearing it or, alternately, an inanimate object about which the collar has been banded, to be seen in the dark.

The improved collar comprises a belt and a connector, the connector having a frame with at least one narrow, elongated slot through which the belt's free end can be threaded, a movable arm pivotally connected to the frame, and means, including a foot on the movable arm, for pressing a short portion of the belt, once its free end has been so threaded, against the frame in such a way that, during use, the entire transverse width of said short portion is pressed between the foot and the frame. Distal from the belt's free end, the belt terminates in a thickened knob which protrudes perpendicularly from both the belt's inner and outer sides. Prior to use, the thickened knob is positioned within the connector so that the knob abuts the frame along both of the slot's elongated edges, these edges being preferably spaced apart by a distance which is just wide enough to allow every part of the belt except for the knob to be passed between them.

In addition, the thickened knob preferably defines a hole, which extends perpendicularly to the belt's longitudinal centerline and which is alignable with a pair of holes formed in the frame, for receiving a metal "D"-shaped ring. Not only can one attach the clip of a leash or the like to this "D"-shaped ring, but also it increases the thickness of the knob, holding the belt even more securely in the elongated slot than it would otherwise be held.

In the preferred embodiment, the belt for the improved collar is fabricated from a rubbery material such as silicon rubber which can be molded in a die to form a smooth finish which does not irritate the hair and skin of animals. Also, during the molding process, a phosphorescent material can be added to the silicon rubber, giving the belt luminescent properties.

In order to fit the improved collar onto an animal's neck or the like, the user first forms a loop in the belt. With the thickened knob secured, within the frame, contiguous with the elongated edges of the slot and with most of the belt disposed, outside of the frame, on the opposite side of the slot from the knob, the belt's free end is then looped back into the frame and pushed through it until the free end re-emerges from the frame. Afterwards, the free end, virtually hidden from view, is positioned between the belt's outer layer, which is part of the loop, and the animal's neck.

Clamping the belt so as to maintain a snug fit follows and is accomplished by rotating the movable arm through an angle of up to approximately 180 degrees. As a result of the arm's rotation, the foot, which may face away from the belt initially, is brought into direct contact with a short portion of the belt and in the process presses this short portion against the frame.

The arm and its foot move in such a way that once the foot engages the belt, pulling on the belt increases those forces pressing it against the frame. In addition, the surfaces of the foot and of the frame which contact said short portion of the belt are preferably knurled in order to give the connector even greater strength.

As a further safety measure, the arm holds its position so tightly, once it has been rotated and the foot pressed against the belt, that it is virtually impossible for a child to unlock the connector, thereby childproofing the improved collar.

DETAILED DESCRIPTION OF THE PREFERRED EMBODIMENT

Figure 1:
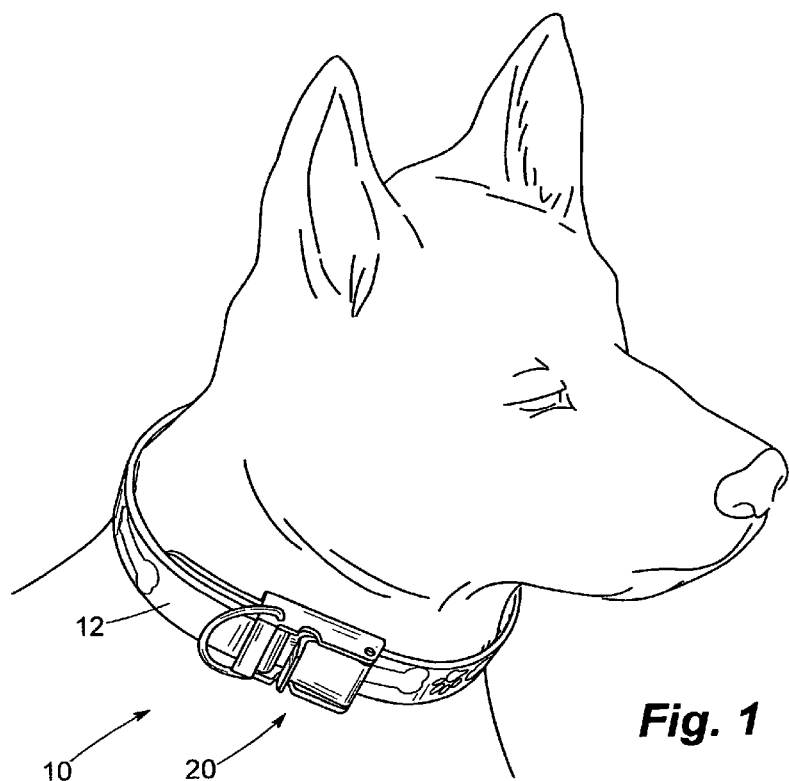
FIG. 1 is a perspective view of the improved collar according to the present invention, the collar being shown fitted on the neck of a typical dog.

In the drawings and indicated generally by the reference numeral 10 is a collar according to the present invention. The collar 10 comprises a closure connector 20 and an elongated, flexible belt 12 having both a free end 16 and distal therefrom a thickened knob 13.

Figure 3:
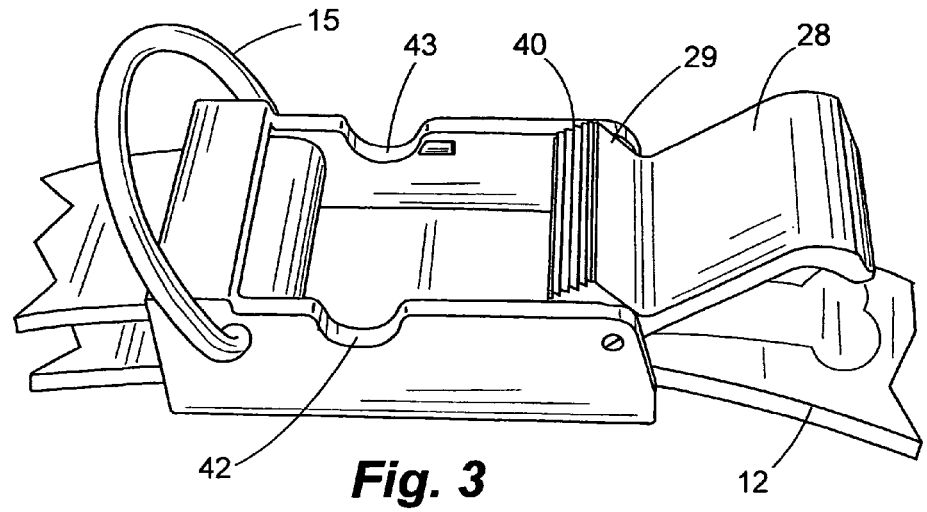
FIG. 3 is a perspective view, on a further enlarged scale, of fragmentary portions of the collar according to FIG. 1, a connector, including a frame and a movable arm pivotally connected thereto, being shown with the arm's foot fully disengaged from the collar's belt.
Figure 4:
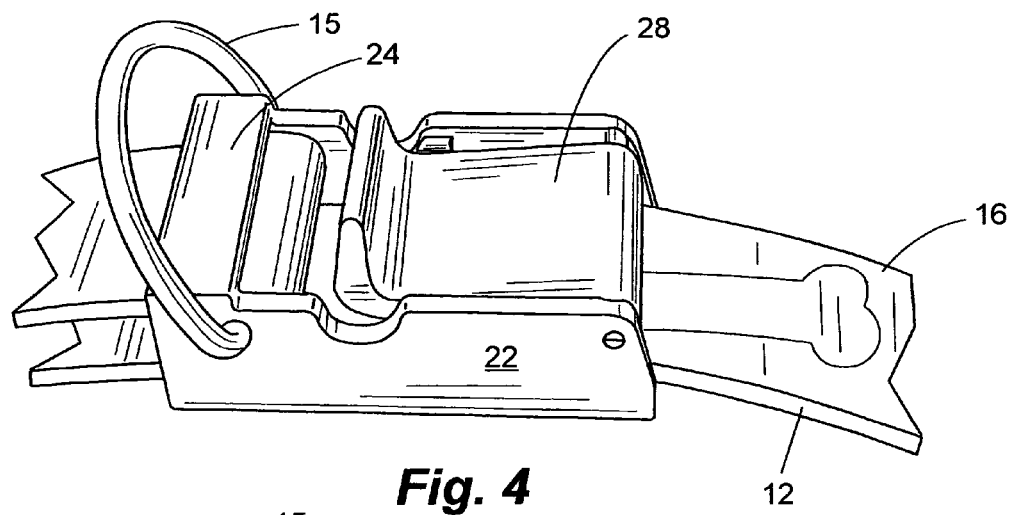
FIG. 4 is a perspective view of the fragmentary portions of the collar according to FIG. 3, the connector being shown with the arm's foot fully engaging the collar's belt.
Figures 8, 9:
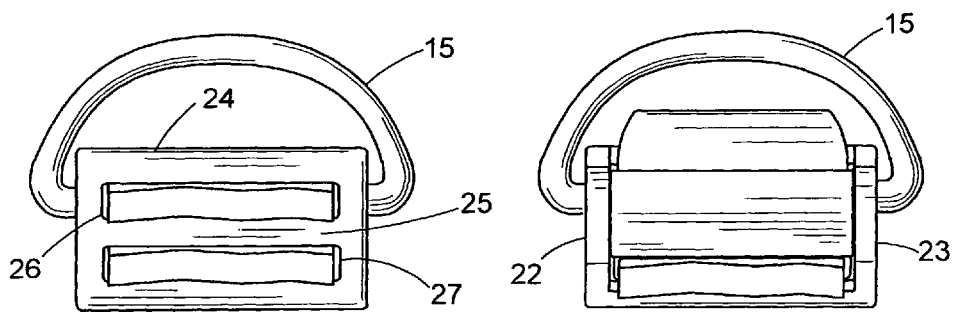
FIGS. 8 and 9 are elevation views of the distal ends of the collar's connector according to FIG. 4, elongated slots formed in one of these distal ends being shown with each slot occupied by a fragmentary portion of the collar's belt.
Figure 10:
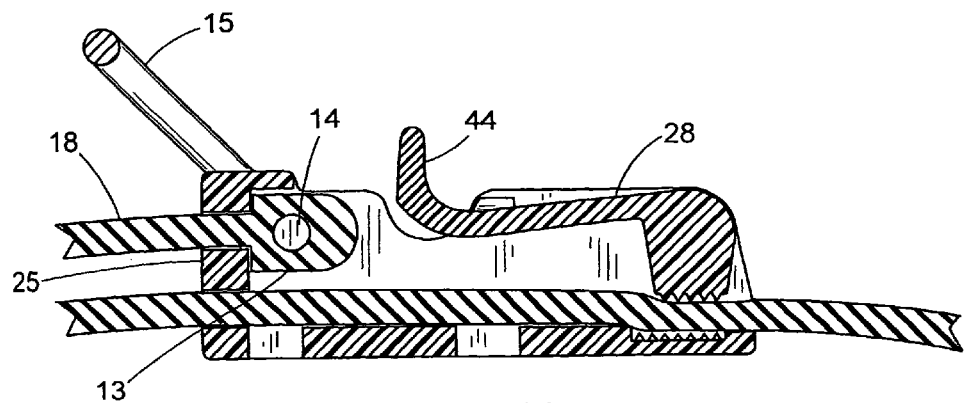
FIG. 10 is a cross-section, on a still further enlarged scale, taken along the longitudinal centerline of the fragmentary portions of the collar according to FIG. 6.
Figure 11:
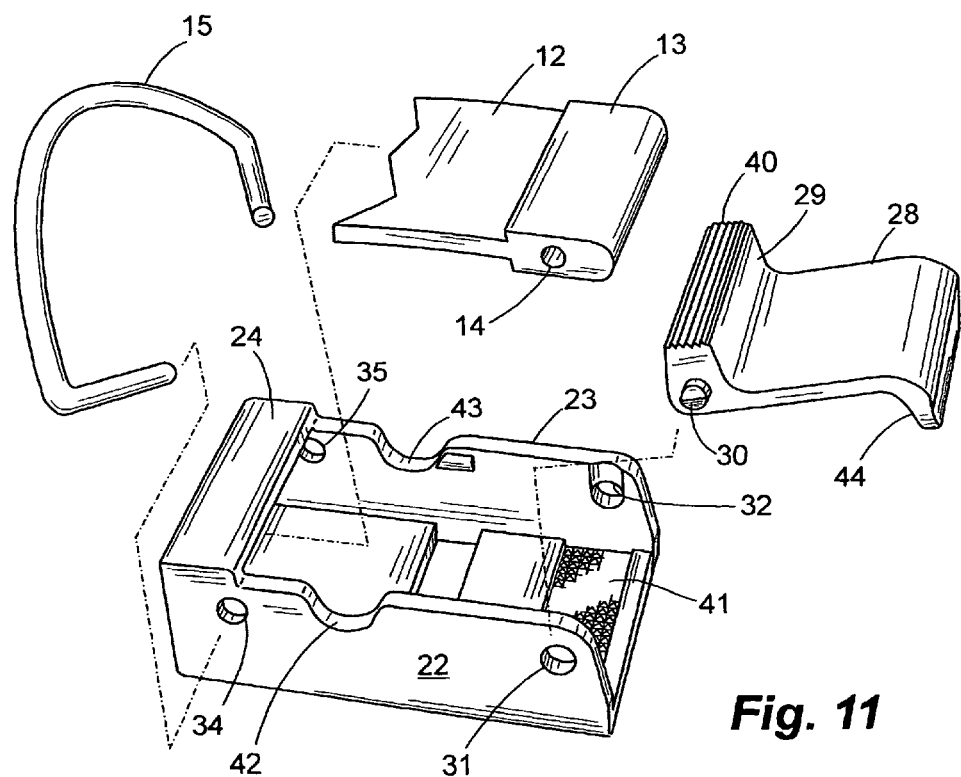
FIG. 11 is an exploded view, on a further enlarged scale, of fragmentary portions of the collar according to FIG. 2, showing the connector and a single short fragment of the collar's belt which terminates in a thickened knob.

The connector 20 includes an open-ended, elongated frame and an arm 28 pivotally connected thereto by a shaft 30 rotatably mounted within holes 31, 32 which are disposed proximate with the frame's open end and formed in opposing sides 22, 23 (FIGS. 3, 4 and 11). Spaced apart from each other by a distance which is preferably slightly greater than the transverse width of the belt 12, the sides 22, 23, together with the frame's base define a "U"-shaped channel. Distal from said open end, the channel is spanned by a narrow bar 24 atop the sides 22, 23 and terminates in a wall 25 in which a pair of elongated slots 26, 27, disposed with their longitudinal axes oriented perpendicularly to said sides, are formed (FIGS. 8 through 11). The distance between the elongated edges of the slot 26, which is located in close proximity to the bar 24, is preferably just wide enough to allow every part of the belt 12 except for the knob 13 to be passed through the slot 26 (FIGS. 8 and 10).

Positioned within the frame prior to use, the knob 13 not only abuts both elongated edges of the slot 26 but also fits just beneath the lower surface of the top bar 24 (FIG. 10). Holding the knob 13 securely against the slot 26 is a metal "D"-shaped ring 15 which is received by holes 34, 35 formed in the frame and a hole 14, alignable therewith, formed in the knob (FIGS. 10 and 11).

Also held in place with the use of holes formed near the upper edges of the sides 22, 23 are the ends of the shaft 30 which protrude from the arm 28. A semi "S"-shaped structure in longitudinal cross-section, the arm 28 defines both a foot 29 and a handle 44 (FIGS. 3, 10 and 11). Curving away from the arm's elongated mid-section, the foot 29 and the handle 44 extend perpendicularly thereto, but in opposite directions and spaced apart from each other.

Figure 5:
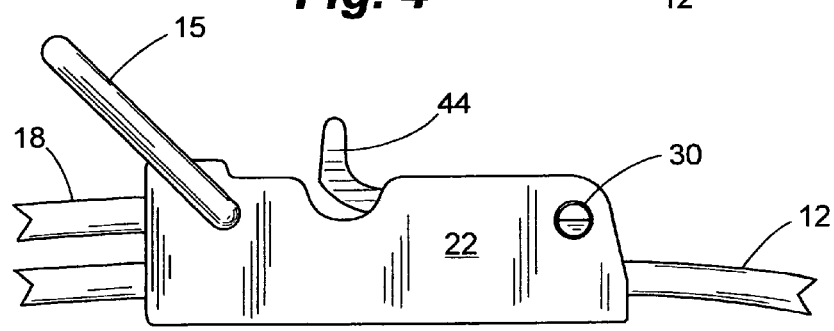
FIG. 5 is a side elevation view of the fragmentary portions of the collar according to FIG. 4.
Figure 6:
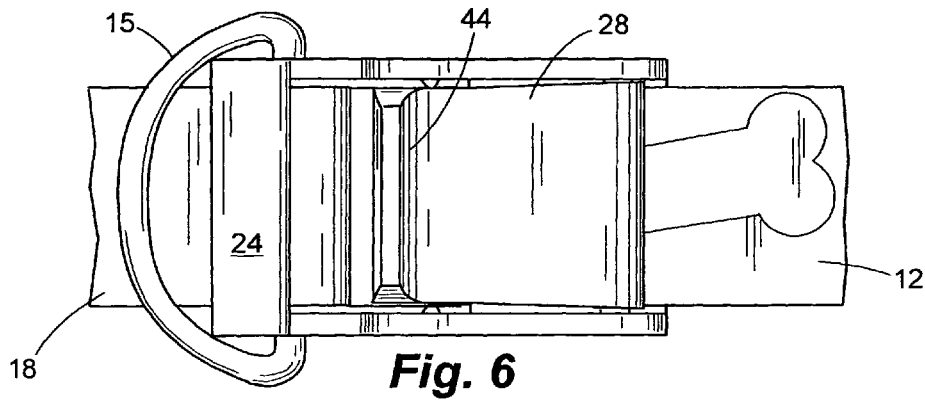
FIGS. 6 and 7 are top and bottom plan views, respectively, of the fragmentary portions of the collar according to FIG. 4.
Figure 7:
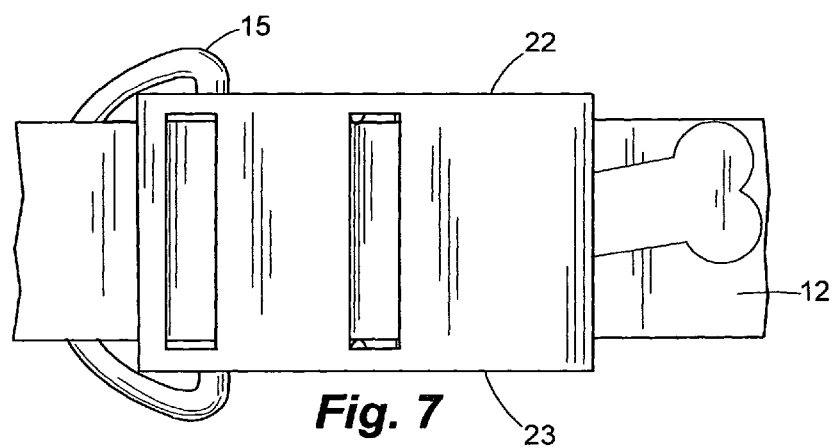

With the shaft's ends engaging the holes 31, 32, which are formed in the frame proximate with its open end, the arm itself is held in such a way that it can rotated into a position in which both the arm's mid-section and the foot 29 are nested between the sides 22, 23 (FIGS. 4 through 6). Moreover, the spacing between the frame's base and the shaft 30, when its ends are so engaged, is such that the foot 29 can clear the base by a distance which is slightly less than the thickness of the belt 12 (FIG. 10). In the preferred embodiment, the foot's contact surface 40 clears a section of the base which defines a shallow recess 41 by said distance (FIGS. 10 and 11).

Unlike the handle 44 which is tapered and narrower towards its tip, both the foot 29 and the arm's elongated mid-section preferably have the same transverse span throughout their respective lengths, said transverse span measuring slightly less than that of the spacing between the sides 22, 23 (FIGS. 3, 4 and 9). Cutouts 42, 43 formed in the sides 22, 23 are situated proximate with the tip of the handle 44, the only portion of the arm 28 which protrudes outwardly from the upper edges of the frame when the arm is otherwise fully nested within its "U"-shaped channel (FIGS. 4, 5 and 10).

Preferably molded from a hard, tough plastic material, the connector 20, including its frame and arm 28, can also be fabricated from a metal; but the material of choice is an ABS plastic, such as ABS-PA757, a product manufactured by the Chimei Corporation of Taiwan.

Figure 2:
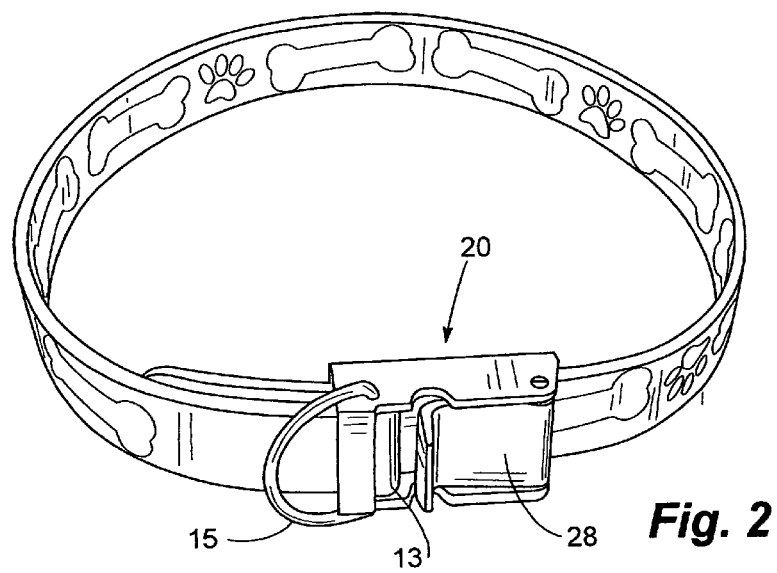
FIG. 2 is a perspective view, on an enlarged scale, of the collar according to FIG. 1.

While the belt 12 can be fabricated from conventional fabric, leather, or a plastic material, it is preferably molded, using silicon rubber or a like rubbery, generally transparent substance. Not only does molding with such a substance allow one to form the belt 12 as a single piece in which the thickened knob 13 with its hole 14 is an integral part of the belt, but also a phosphorescent additive can be incorporated into the mold, giving the finished belt luminescent properties. In addition, ornamental designs can be readily imprinted on the belt 12 during the molding process (FIG. 2).

A suitable silicon rubber is available commercially from Hongda New Material Co., Ltd., China and is known as this company's Product No. 7861WJL. When molded, this silicon rubber, with a Durometer reading of 65±5 A in the preferred embodiment, has been formed into belts having both smooth and design finishes. Very flexible and slightly elastic in character, a belt 12 fabricated of this material gives a slick, rubbery feeling when touched and is generally nonirritating to the skin and hair of animals wearing such a belt.

Moreover, cast as a mixture with a suitable phosphorescent additive, the preferred silicon rubber yields a belt 12 which can be seen in the dark. Its luminescent properties are especially pronounced when coarse particles of a substance known as LumiNova® G-300 M or, alternately, LumiNova® G-300 L, are incorporated into the mold. Manufactured by Nemoto & Co., Ltd., of Tokyo, Japan, this material, as tests of its luminance have revealed, is not only up to ten times brighter than are conventional zinc sulfide-based phosphorescent pigments, but also the length of its afterglow is longer than theirs by an order of magnitude. Based on strontium oxide aluminate chemistry, LumiNova® G-300 M, similar to alumina in hardness, has sharp-edged, needle-like particles which typically range in size from 10 to 40 micrometers. The percentage by weight of these particles in said silicon rubber mixture is preferably about 18 percent but can range between 5 and 30 percent and still give the belt 12 both pronounced luminescent properties and adequate tensile strength to restrain a typical dog.

Tested for tensile strength, a collar 20 having a belt 12 molded out of the preferred silicon rubber/phosphorescent additive mixture, with the belt measuring 1 inch wide, ⅛th inch thick, and about 18 inches long, was found to have a tension breaking strength of approximately 130 pounds of force. Of six specimens tested, only four of them actually broke when their respective belts 12 were stretched to the full limit of the test frame; and none of these breakages occurred because of a failure of the connector 20.

At the outset of the collar's assembly, the arm 28 is rotatably mounted on the connector's frame by spreading its sides 22, 23 apart slightly to accommodate the ends of the shaft 30, so that they can be rotatably received within holes 31, 32. The belt's free end 16 is then inserted beneath the connector's top bar 24 and threaded through its upper slot 26 until the thickened knob 13 is brought into contact with the upper slot's elongated edges. After that, the "D"-shaped ring 15 is installed by first positioning the thickened knob 13 in such a way that it not only abuts the slot 26 but also the knob's hole 14 is aligned with paired holes 34, 35 formed in the frame's sides 22, 23. The "D"-shaped ring 15 itself is then simultaneously inserted into the paired holes 34, 35 and pressed into the thickened knob's hole 14, thereby completing the collar's assembly.

Fitting the collar 10 onto a dog entails encircling his neck with the belt 12 and then positioning an end portion thereof disposed distal from the thickened knob 13 within the connector 20. Properly positioned, the end portion passes under the foot 29 and extends from the frame's open end to the lower slot 27, with the belt's free end 16 protruding outwardly therefrom (FIG. 1). Thus situated, the free end 16 remains virtually hidden from view between the belt's outer layer 18 and the animal's neck (FIGS. 5, 6 and 10).

Once the belt has been adjusted so as to provide a comfortable fit about the dog's neck, one can then activate the collar's closure mechanism by simply rotating the arm 28 downwardly into the connector's frame until the foot 29 pinches the belt 12 against the frame's base.

In the preferred embodiment, the portion of the belt so pinched is sandwiched between the foot's contact surface 40 and the shallow recess 41 (FIGS. 10 and 11). Roughened by knurling or the like on their respective mating surfaces, the foot 29 and the shallow recess 41 engage the belt 12 in such a way that a dog, by pulling on a collar 10 fitted about his neck, tends to draw the end of the arm 28 distal from the foot further into the "U"-shaped channel. In the process, the contact surface 40 is tipped upwardly towards the frame's open end, thereby creating a small gap. Simultaneously, as the dog subsequently releases his pull, the rubbery belt 12 springs back, filling this gap, and forms a wedge between the foot 29 and the recess 41. This wedge then prevents the arm 28 from automatically returning to the position it assumed earlier, prior to the dog's pulling action, and in effect provides the collar 10 with a self-clamping closure mechanism.

To remove the collar 10, one deactivates its closure mechanism by grasping the handle 44 and rotating the arm 28 upwardly until the belt 12 is freed and can be slid out of the connector's open end. A tool such as a screwdriver's blade (not shown) can be inserted through the cutouts 42, 43 and beneath the arm 28 and has been found to be useful, even necessary, for unlocking the connector 20 once the self-clamping closure mechanism is engaged.

The invention claimed is:

1. A method for fitting a collar snugly about an animal's neck, which comprises:
    (a) forming a loop around the animal's neck with an elongated belt and a connector, the connector having a frame to which one end of the belt is anchored and an arm with a foot, the frame including a base, a pair of opposing sides, and a slotted wall which is spaced apart from the base and forms a bridge between the opposing sides, each of said sides extending longitudinally between the frame's open end and the slotted wall, the arm being pivotally connected to the frame and rotatable into a position in which the foot is nested between the opposing sides, a portion of the belt protruding outwardly from the frame through an elevated slot defined by said wall when the loop is so formed, said portion being disposed distally from the free end;
    (b) pushing the belt's free end into the frame in such a way that the free end passes first between the frame's base and the arm and then between the slotted wall and the base, said pushing being continued until the free end juts out of the frame and a desired length of the belt, proximate with the free end, has been received within the frame, thus positioning the free end beneath said outwardly protruding, distal portion of the belt and between said portion and the animal's neck;
    (c) adjusting the tightness with which the loop fits about the animal's neck in virtually infinitesimally small increments by moving said length of the belt back and forth within the frame; and
    (d) rotating the arm so as to bring the foot into contact with a short section of the belt and, in the process, press the short section against the connector's frame.

2. A method for fitting a collar snugly about an animal's neck, which comprises:
    (a) forming a loop around the animal's neck with an elongated belt and a connector, the connector having a frame to which one end of the belt is anchored and an arm with a foot, the frame including a base, a pair of opposing sides, and a slotted wall which defines two elongated, spaced apart slots oriented perpendicularly to the opposing sides, the first elongated slot being disposed generally parallel to and upwardly of the second elongated slot, the arm being pivotally connected to the frame and rotatable into a position in which the foot is nested between the opposing sides, a portion of the belt, when the loop is so formed, protruding outwardly from the frame through the first elongated slot, said portion being disposed distally from the free end;
    (b) pushing the belt's free end into the frame in such a way that the free end passes between the frame's base and the arm, said pushing being continued until the free end protrudes outwardly from the frame through the second elongated slot and a desired length of the belt has been received within the frame, thus positioning the free end between said distal portion of the belt and the animal's neck;
    (c) adjusting the tightness with which the loop fits about the animal's neck in small increments by moving said length of the belt back and forth within the frame; and
    (d) rotating the arm so as to bring the foot into contact with a short section of the belt and, in the process, press the short section against the connector's frame.

3. The method according to claim 2, which further comprises pulling on the belt, fabricated from a rubbery material, in a direction which is generally the reverse of that followed in pushing the belt's free end into the frame, such pulling, when carried out successively following each time the foot has been brought into contact with and pressed the belt's short section against the connector's frame, tipping the foot's contact surface upwardly and creating a small gap into which the belt, once released from said pulling, springs back, filling the gap and forming a wedge, thereby adding to the arm's degree of rotation and simultaneously augmenting forces which keep the foot in contact with the belt.

4. The method according to claim 2 which further comprises affixing a "D"-shaped ring to the end of the belt anchored to the frame, said end including a thickened, generally cylindrically shaped knob which is of sufficiently large diameter that it abuts the slotted wall rather than being threadable, like the belt's free end, between the first slot's elongated edges, the thickened knob defining a through opening which is alignable with a pair of holes defined by the opposing sides, the "D"-shaped ring being simultaneously inserted into the paired holes and pressed into the thickened knob's through opening when, at the same time the paired holes and the through opening are in alignment with each other, the belt's parts which are threadable into and out of the first elongated slot have been threaded through it, thus positioning the "D"-shaped ring to function as a locking pin for the anchored end of the belt.

5. A method for fitting a collar snugly about an animal's neck, which comprises:
(a) forming a loop around the animal's neck with an elongated belt and a connector, the connector having a frame to which one end of the belt is anchored and an arm, the distal ends of which terminate in a foot and a handle, respectively, the frame's opposing sides, except for a pair of inwardly protruding, opposing bulges defined by the opposing sides, being spaced apart from each other by a distance which is greater than the width of the arm's longest transverse cross-section, the arm being pivotally connected to the frame and rotatable into a position in which the foot is nested between the frame's opposing sides, a portion of the belt protruding outwardly from the frame when the loop is so formed, said protruding portion being disposed proximate with said anchored end of the belt;
(b) pushing the belt's free end into the frame in such a way that the free end passes between the frame's base and the arm, said pushing being continued until a desired length of the belt proximate with the free end has been received within the frame;
(c) adjusting the tightness with which the loop fits about the animal's neck in small increments by moving said length of the belt back and forth within the frame; and
(d) rotating the arm so as to bring the foot into contact with a short section of the belt and, in the process, press the short section against the connector's frame, said rotation of the arm being continued until a pair of spaced apart lateral edges along a short span of the arm's mid-section has been forceably slid across said pair of inwardly protruding, opposing bulges, said pair of lateral edges being spaced apart from each other by a distance which is at least as great as that of the spacing between said pair of opposing bulges, thereby magnifying, when the arm's rotation has been so continued, the force which must be applied to the arm's handle to rotate the foot away from the belt.

* * * * *